Nov. 6, 1934.  D. F. SPROUL  1,979,846
CUSHIONING DEVICE
Filed May 25, 1932  2 Sheets-Sheet 1

Inventor
Donald F. Sproul
By Gillson, Mann & Co.
Attys.

Nov. 6, 1934.                D. F. SPROUL                1,979,846
                           CUSHIONING DEVICE
                        Filed May 25, 1932          2 Sheets-Sheet 2
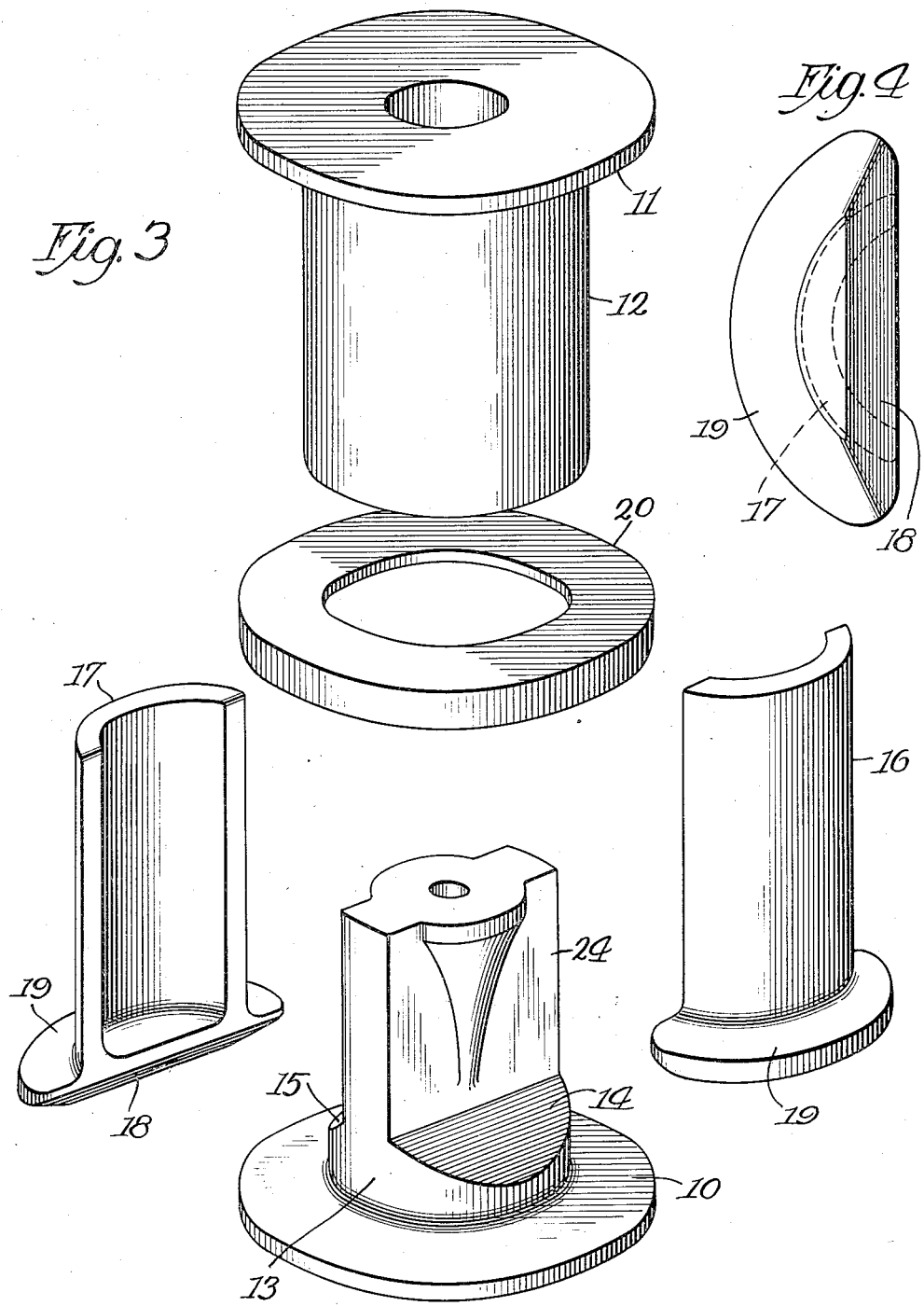

Patented Nov. 6, 1934

1,979,846

UNITED STATES PATENT OFFICE 1,979,846

CUSHIONING DEVICE

Donald F. Sproul, Chicago, Ill., assignor to Cardwell Westinghouse Company, a corporation of Delaware Application May 25, 1932, Serial No. 613,423

2 Claims. (Cl. 267—9)

The invention relates to cushioning devices, and is especially adapted for supporting railway car bolsters, and is shown and described in a form adapted for such use.

Its objects are to secure simplicity of construction, reliability of action and high efficiency.

In the drawings:

Fig. 3 is a group of various friction elements of the device, shown in perspective; and Fig. 4 is an end view of one of the elements shown in Fig. 3.

Figure 1:
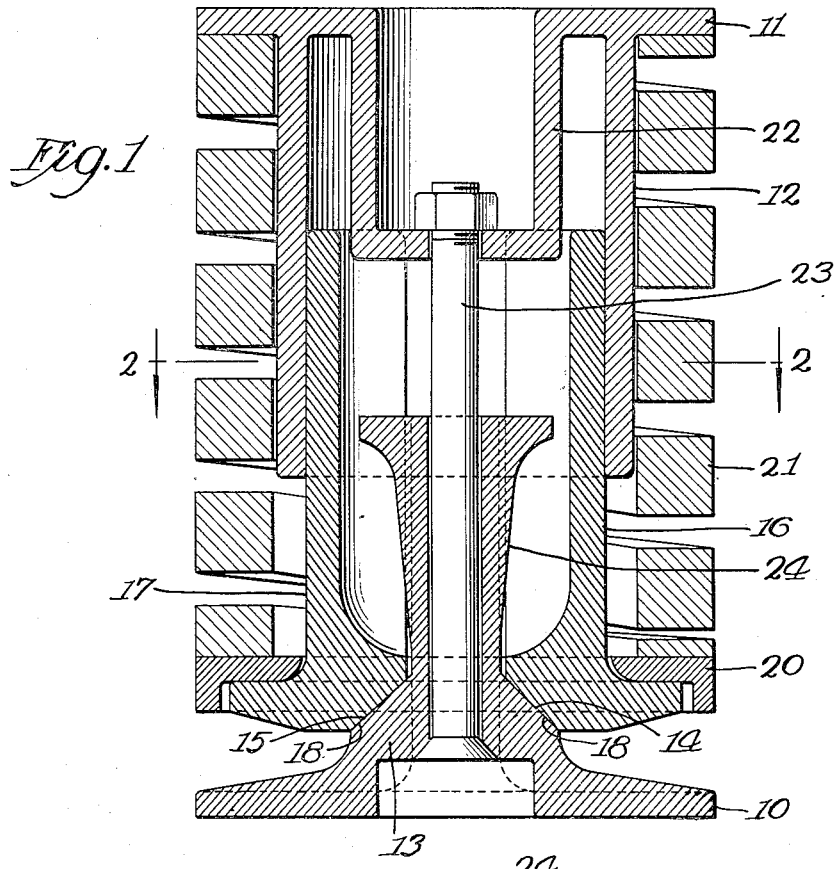
Fig. 1 is a central longitudinal section of the device.
Figure 2:
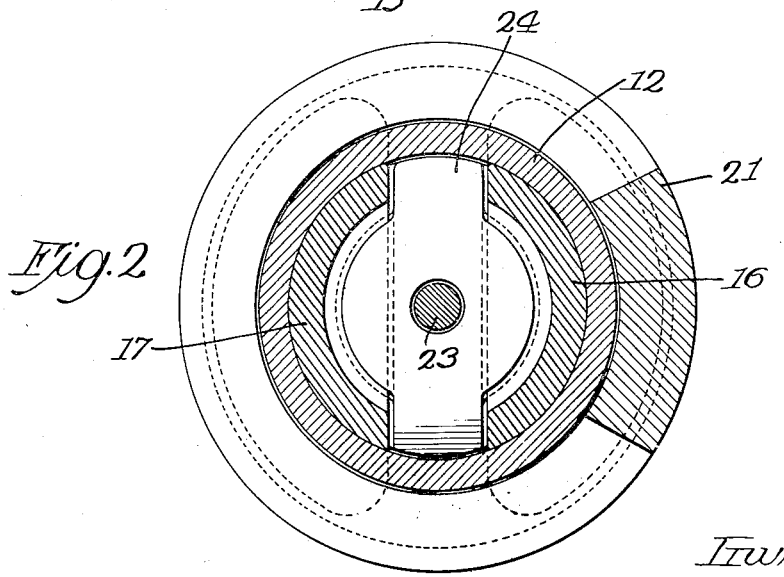
Fig. 2 is a sectional view on the line 2—2 of Fig. 1.

The invention comprises a pair of opposed followers, as 10, 11, the one adapted to seat upon a support, such as the lower arch of the side frame of a car truck, and the other to carry the load, such as the car bolster.

Cast integrally with one of the followers, preferably, as shown, the upper one 11, and projecting from its inner face, is a cylinder 12. Projecting inwardly from the other follower 10 is a central boss 13, the inner face of which is provided with a pair of plain oppositely disposed forwardly and inwardly inclined wedging faces 14, 15.

A pair of segmental friction shoes 16, 17, project into and engage the inner wall of the cylinder 12. Each of these shoes is provided at its outer end with a wedging face, as 18, for cooperating with one of the wedge faces 14, 15, and with an outstanding shoulder 19. An annular spring seat 20 is carried by the shoulders 19, 19. A helical spring 21 loosely encloses the cylinder 12 and reacts between the follower 11 and the seat 20.

The central portion of the follower 11 is offset inwardly, as shown at 22. The boss 13 and the inner end of the offset 22 are centrally apertured to receive a bolt 23 for tying the two followers together. The chamber of the offset portion 22 of the follower 11 is of sufficient depth to permit the desired maximum compression of the device without bringing the car bolster into contact with the end of the bolt 23. Projecting inwardly from the central portion of the boss 13 is a stem 24, of sufficient length to form a limiting stop by contact with the inner end of the offset 22 of the follower 11.

When the parts are assembled the nut carried by the bolt 23 is turned up to place the spring 21 under slight compression. The spring pressure urges the wedge faces of the friction shoes into engagement with the wedge faces 14, 15, and the wedges urge the shoes radially outward against the walls of the cylinder 12. Compressive force applied to the follower 11 increases the pressure, through the spring 21, upon the shoulders of the friction shoes, and the wedges increase the pressure of the shoes against the cylinder 12.

The shoes are maintained in frictional contact with the cylinder 12 by the downward pressure upon their outstanding shoulders and the resistance thereto of the wedges. As wear of the wedge faces occurs the shoes descend vertically. As wear of the engaging friction faces of the shoes and cylinder occurs the shoes will move radially outward, sliding down slightly upon the wedges 14, 15. Under all circumstances the shoes and cylinder are maintained in contact throughout the entire areas of their engaging surfaces, and with uniform radial pressure.

I claim as my invention—

1. In a cushioning device, a pair of cooperating friction elements having relative longitudinal movement, one of such elements being in the form of a lever and having a lateral projection at its rearward end constituting the power arm of the lever, a spiral spring reacting between such arm and a fixed seat, and a fulcrum for the lever approximately in line with the arm and having the form of a backward and outwardly inclined plane wedge.

2. In a cushioning device, in combination, a pair of opposed followers, one thereof having an inwardly projecting cylindrical casing and the other an instanding boss having lateral backwardly and outwardly inclined plane faces, a pair of segmental shoes associated with the boss, their inner ends overlapping and frictionally engaging the inner surface of the inner end of the casing, such shoes having inclined heels complementary to and engaging the inclined faces of the boss and having outstanding flanges adjacent to their outer ends, the inclined heels and outstanding flanges being approximately in the same transverse plane, and a helical spring reacting between the shoe flanges and the cylinder carrying follower.

DONALD F. SPROUL.